United States Patent
Shimada et al.

[11] 4,139,737
[45] Feb. 13, 1979

[54] TIME DIVISION MULTIPLEX TRANSMISSION SYSTEM IN WHICH ELECTRICAL POWER IS TRANSMITTED TO REMOTE TERMINALS FROM A CENTRAL UNIT SIMULTANEOUSLY WITH ADDRESS AND CONTROL SIGNALS

[75] Inventors: Isao Shimada, Kyoto; Osamu Akiba, Hirakata, both of Japan

[73] Assignee: Matsushita Electric Works, Ltd., Osaka, Japan

[21] Appl. No.: 829,885

[22] Filed: Sep. 1, 1977

[30] Foreign Application Priority Data

| Sep. 10, 1976 [JP] | Japan | 51-109274 |
| Sep. 10, 1976 [JP] | Japan | 51-109275 |
| Sep. 10, 1976 [JP] | Japan | 51-109276 |
| Sep. 10, 1976 [JP] | Japan | 51-109277 |

[51] Int. Cl.² .................................................. H04J 3/08
[52] U.S. Cl. ................................... 179/15 AL; 340/183
[58] Field of Search .................... 179/15 AL, 2 AM; 340/151, 183, 203

[56] References Cited

U.S. PATENT DOCUMENTS

| 3,717,858 | 2/1973 | Hadden | 340/203 |
| 4,004,097 | 1/1977 | Spaulding | 179/2 AM |
| 4,053,714 | 10/1977 | Long | 179/15 AL |

*Primary Examiner*—William C. Cooper
*Assistant Examiner*—Joseph A. Popek
*Attorney, Agent, or Firm*—Burns, Doane, Swecker & Mathis

[57] ABSTRACT

A time division multiplex transmission system including a central unit and a plurality of terminal units connected through a single pair of bus lines to the central unit. The central unit transmits at least a set of address and control signals sequentially to the respective terminal units and also an electric power required for operating and controlling the respective terminal units at least accompanying the address and control signals. The respective terminal units include a condenser for accumulating the electric power from the central unit so that each terminal unit corresponding to each address signal from the central unit performs any desired operation with the accumulated power and transmits a response signal depending on a result of the operation to the central unit responsive to the control signal.

7 Claims, 26 Drawing Figures

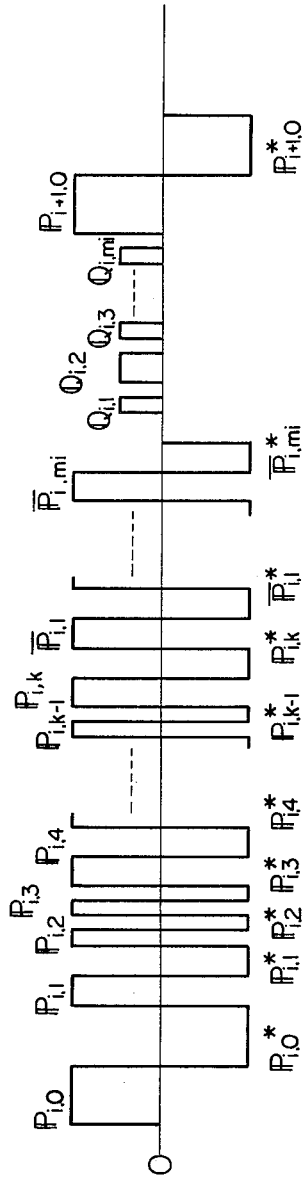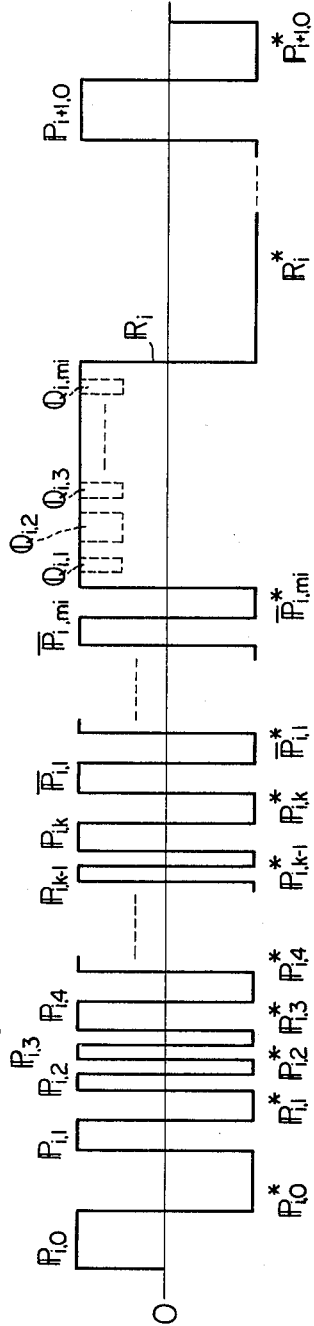

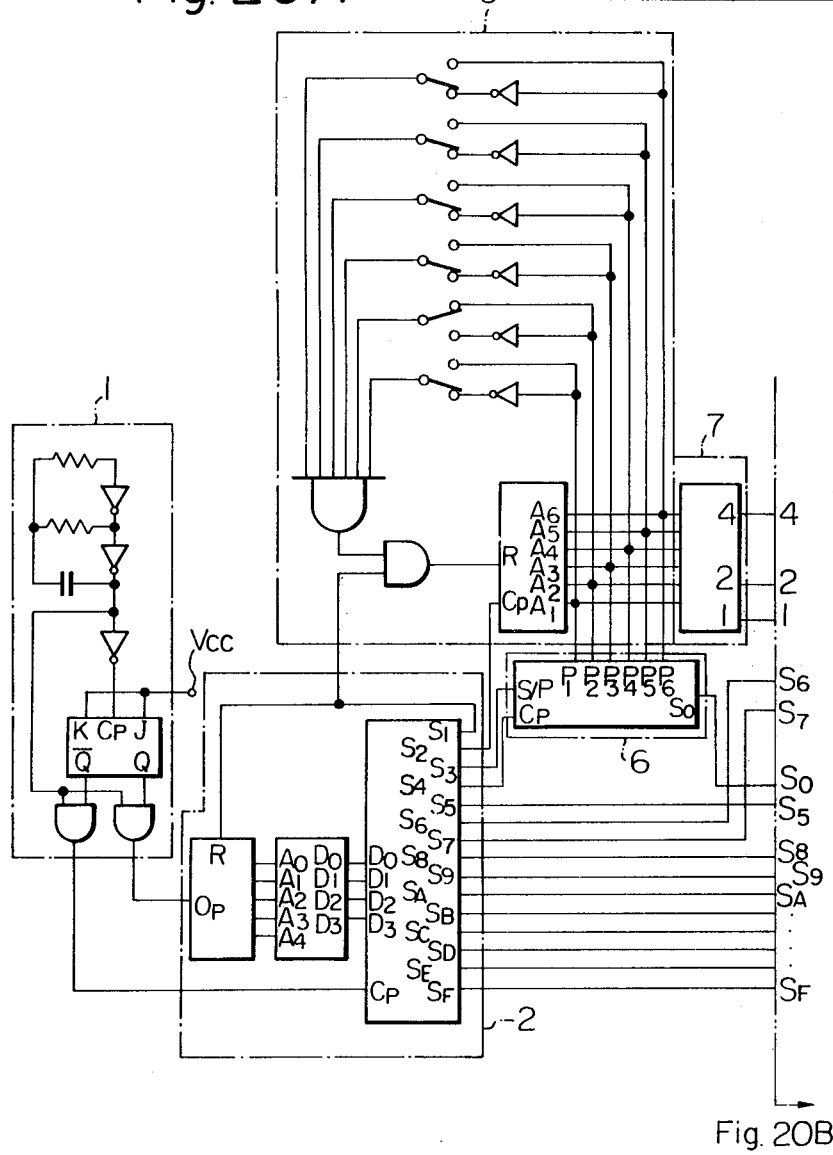

TIME DIVISION MULTIPLEX TRANSMISSION SYSTEM IN WHICH ELECTRICAL POWER IS TRANSMITTED TO REMOTE TERMINALS FROM A CENTRAL UNIT SIMULTANEOUSLY WITH ADDRESS AND CONTROL SIGNALS

This invention relates to time division multiplex transmission systems and, more particularly, to improvements in time division multiplex transmission systems wherein address, control and the like signals are transmitted from a central control unit to a plurality of terminal units to operate them.

In this kind of conventional time division multiplex transmission systems, a pair of electric power feeding lines and another pair of signal transmitting lines have been provided between the central unit and the respective terminal units. However, with such arrangement, there have been difficulties in that the wiring is complicated and that a miswiring is likely to be made and further the material and cost have not been able to be reduced.

Alternatively a pair of transmission lines have been arranged between the central unit and the respective terminal units and, further, modulators and demodulators have been inserted between the central unit and the said transmission lines and between the respective terminal units and the transmission lines so that the address, control, response and the like signals have been superposed on electric power waves to be transmitted between the central unit and the respective terminal units. However, with this arrangement, the modulators and demodulators have been required, the system formation has been complicated and the cost reduction has not been able to be attained.

In a further example, a pair of transmission lines have been provided between the central unit and the respective terminal units so that electric power has been respectively independently fed to the central unit and to the respective terminal units. In this case, an electric power source has been independently required for each of the terminal units and, therefore, the cost reduction has been also unable to be attained.

The present invention has been suggested to solve such defects as described above by accumulating in the respective terminal units an electric power accompanying at least the address and control signals time divisionally transmitted out of the central control unit and obtaining required electric power for operating the respective terminal units with the thus accumulated electric power.

A primary object of the present invention is, therefore, to provide a time division multiplex transmission system wherein a pair of transmission lines are provided between a central control unit and a plurality of terminal units so that each terminal unit receives and accumulates therein an electric power accompanying such signal as address, control and the like signals transmitted from the central unit to the respective terminal units and such received and accumulated electric power in each terminal unit is utilized as required power for the operation of the terminal unit.

Another object of the present invention is, secondly, to provide a time division multiplex transmission system which is adapted to constantly continuously transmit a predetermined voltage from a central control unit to a plurality of terminal units so as to improve the electric power supply to the respective terminal units.

A further object of the present invention is, thirdly, to provide a time division multiplex transmission system wherein a predetermined electric power is fed from a central control unit to a plurality of terminal units at the time of transmitting response signals from the respective terminal units to the central unit to have the response signals transmitted with current signals, whereby the electric power supply at the time of transmitting the response signals in the respective terminal units is improved and the response signals are well attained.

A yet further object of the present invention is to provide a time division multiplex transmission system wherein address, control and the like signals transmitted from a central control unit to a plurality of terminal units are provided with a predetermined symmetry in multiple polarities so as to elevate the freedom of the wiring between the central unit and the respective terminal units with respect to signal and power transmission lines.

Other objects and advantages of the present invention shall become clear upon reading the following explanation of the invention detailed with reference to certain preferred embodiments shown in accompanying drawings, in which.

Figure 2:
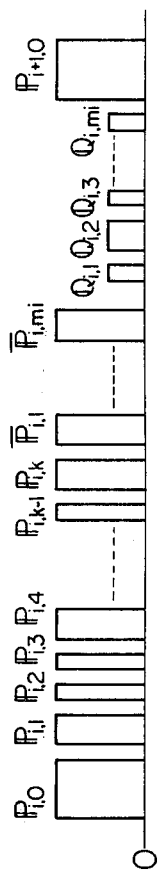
Figure 3:
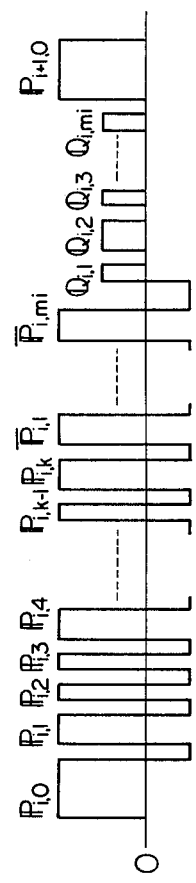
FIG. 3 is a signal wave form diagram as a second embodiment of the present invention, wherein a reverse polarized direct current voltage is superposed on a signal $$(\sum_{j=0}^{k} P_{ij} + \sum_{j=1}^{mi} \bar{R}_{ij})$$
Figure 4:
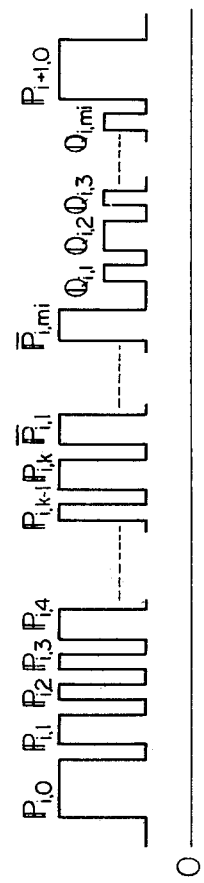
Figure 5:
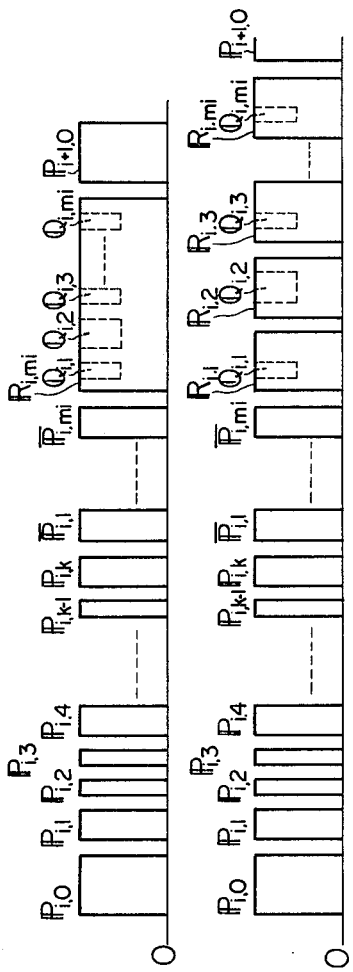
Figure 6:
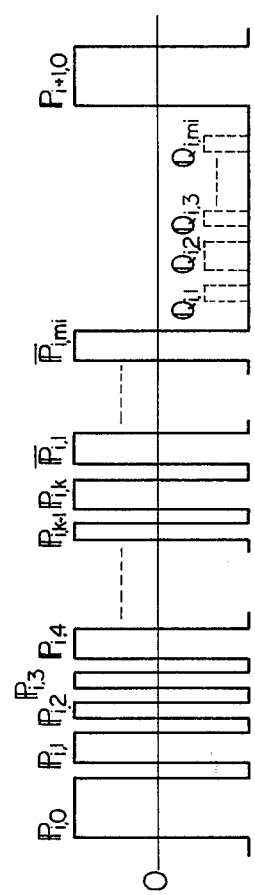
Figure 7:
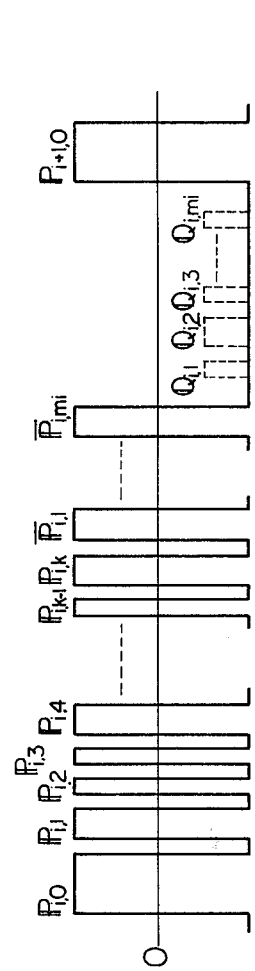
Figure 10:
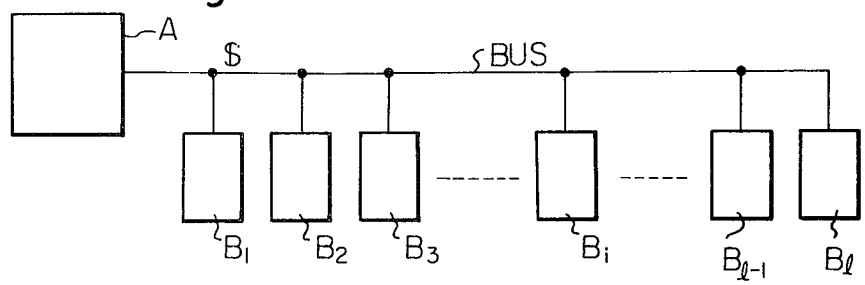
Figure 18:
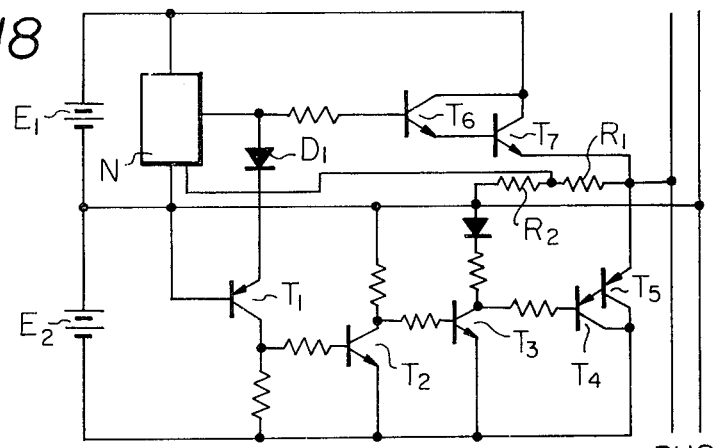
Figure 19:
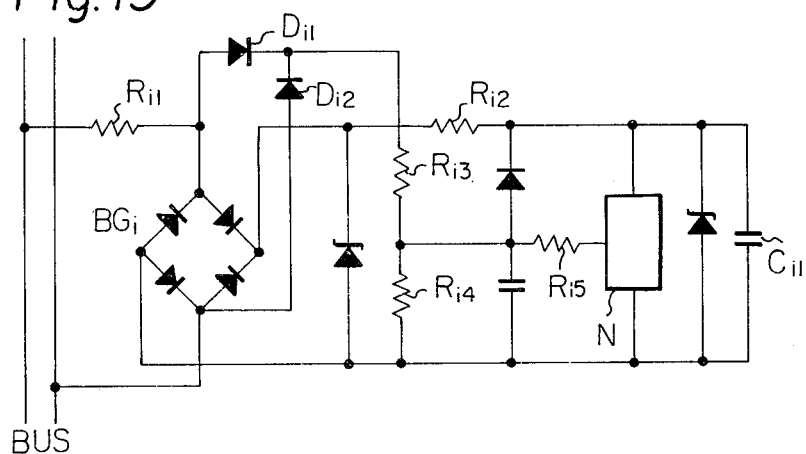
Figure 11:
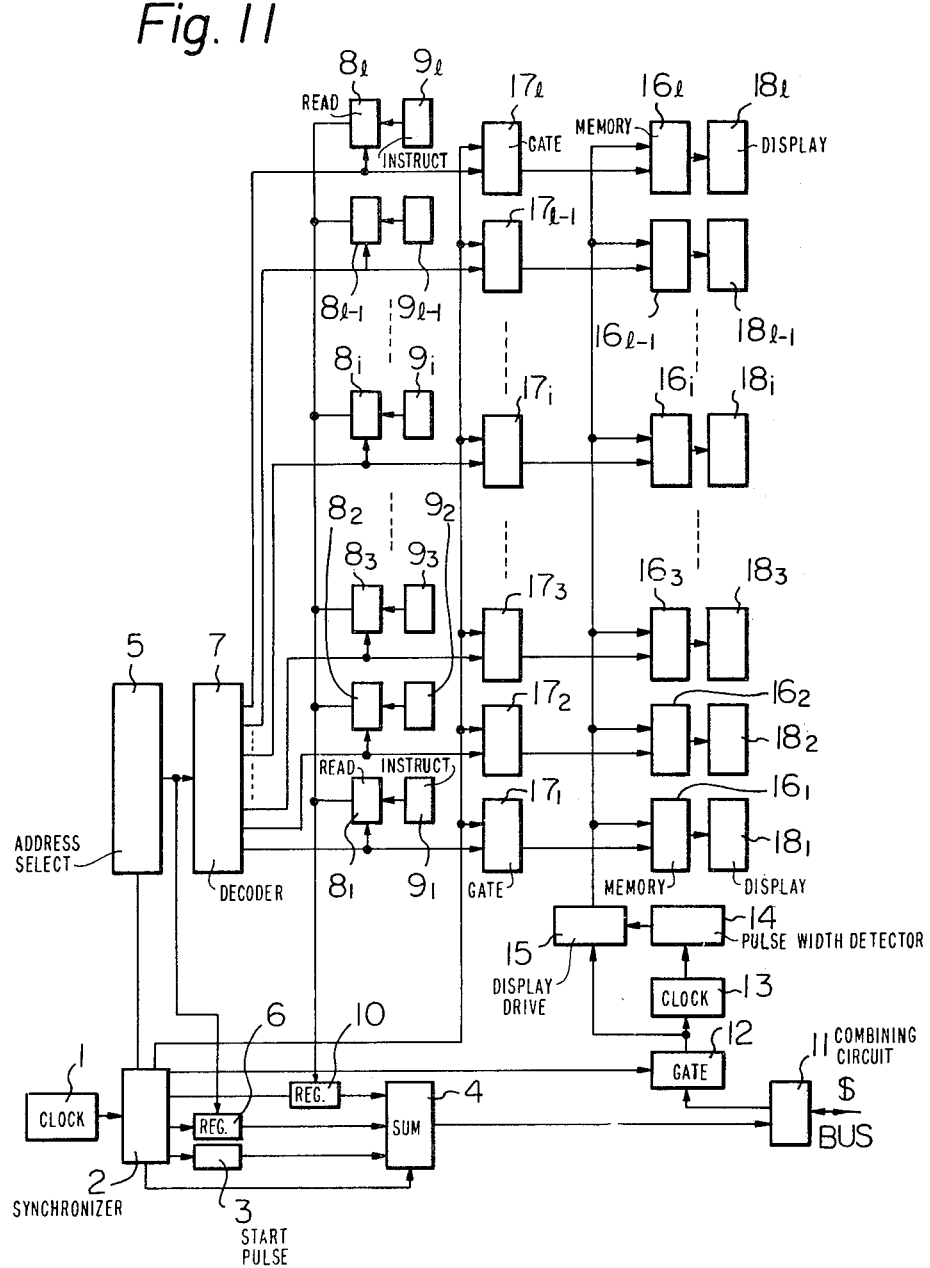
Figure 12:
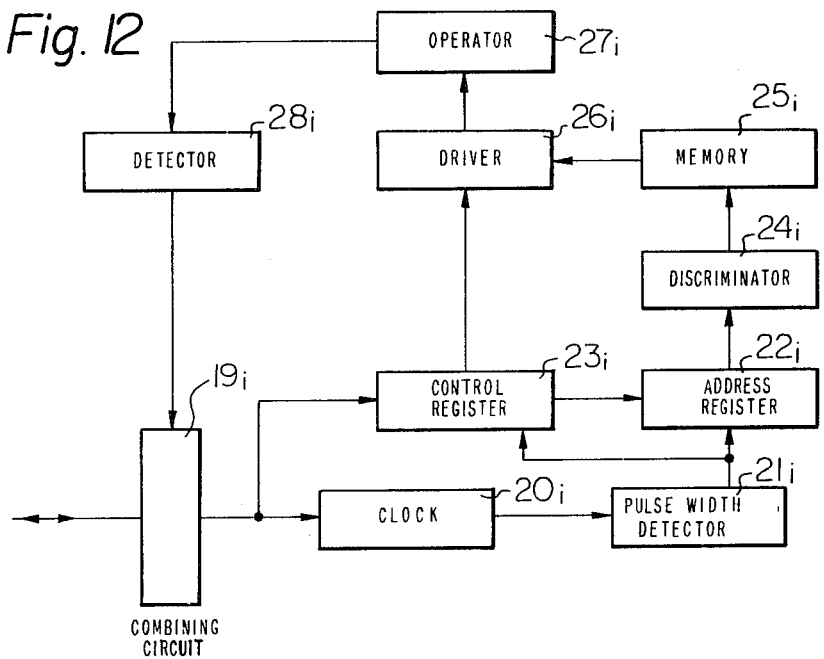
Figure 13:
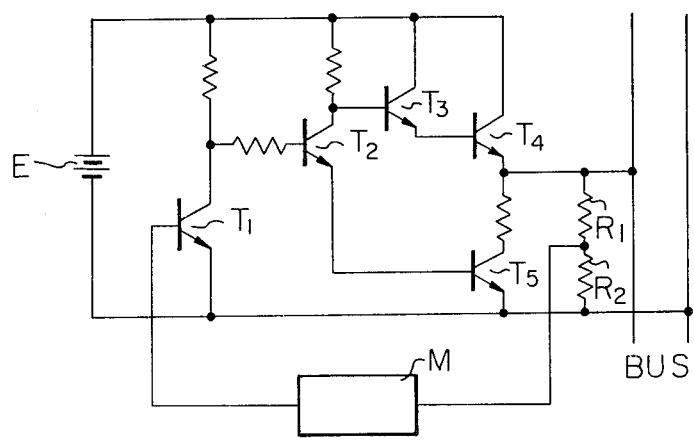
Figure 14A:
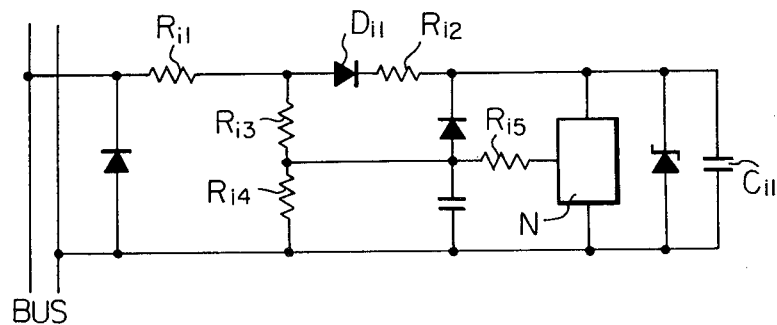
Figure 14B:
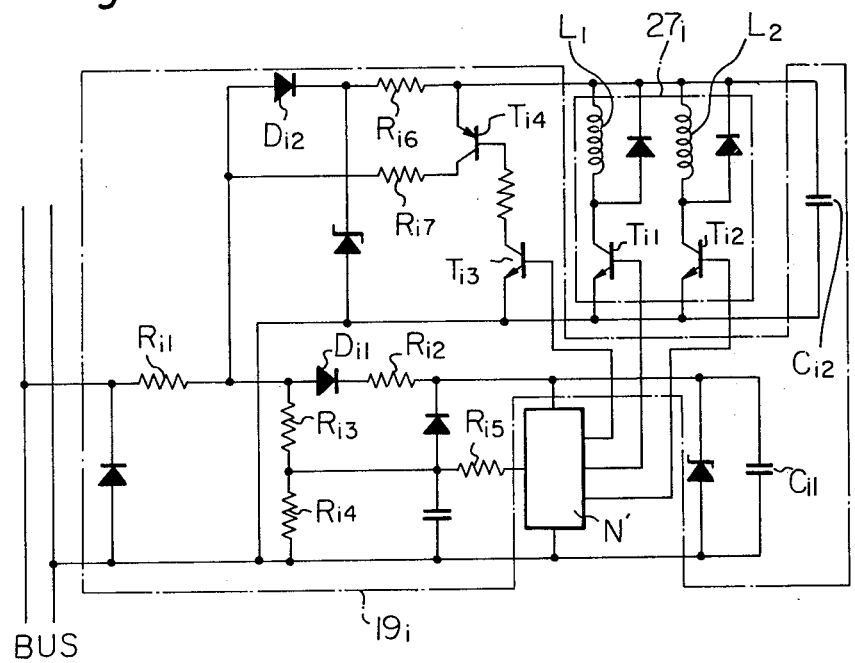
Figure 14C:
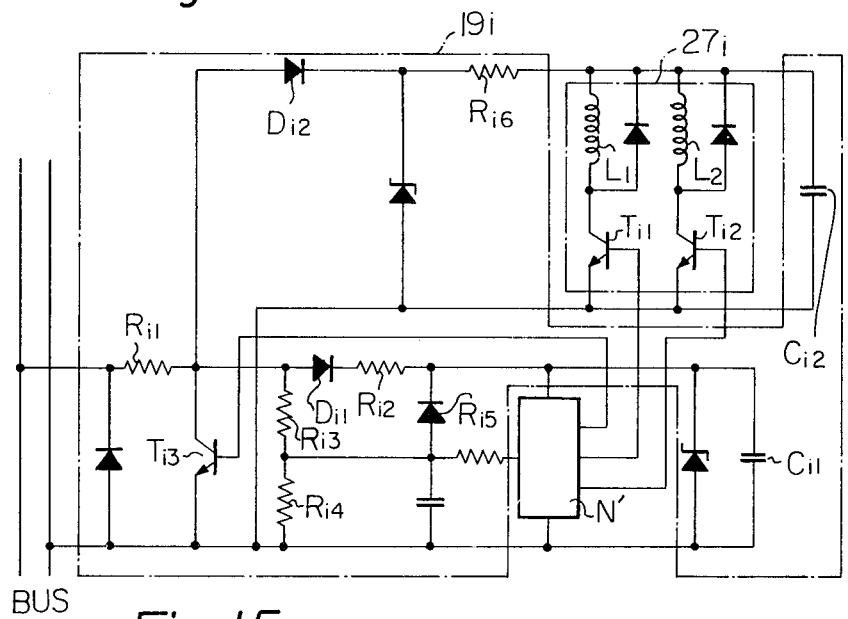
Figure 15:
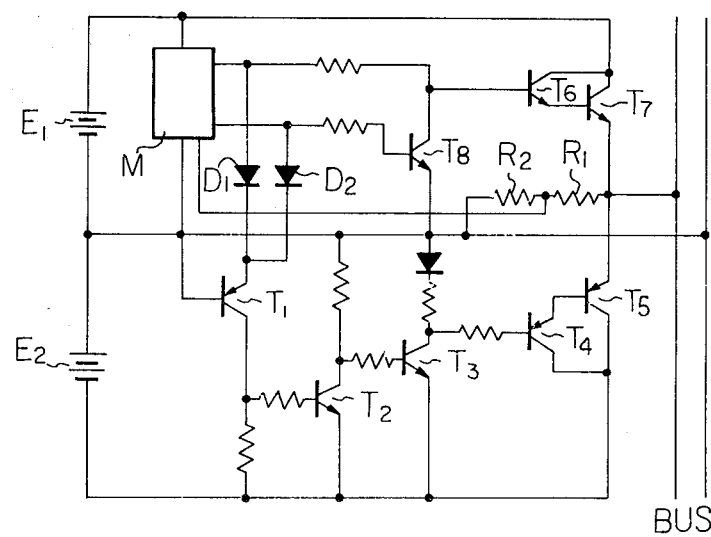
Figure 16A:
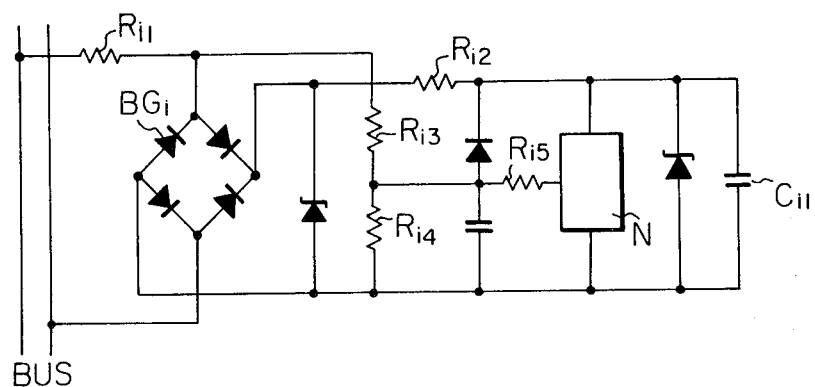
Figure 16B:
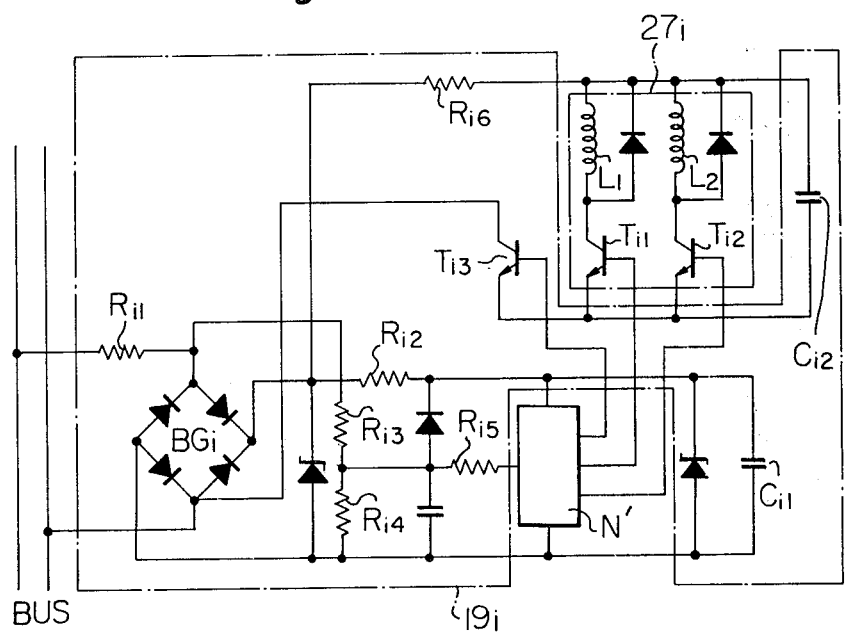
Figure 16C:
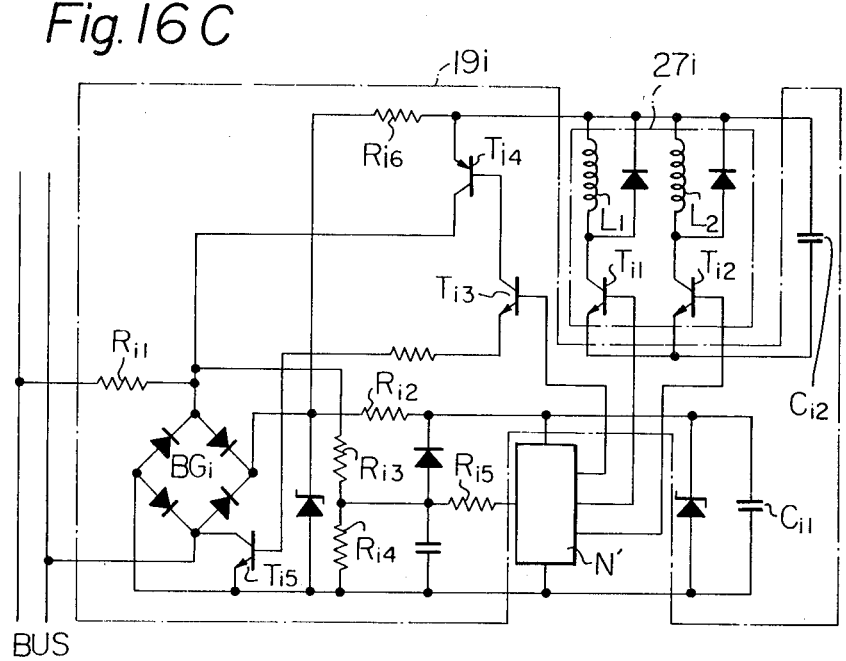
Figure 17:
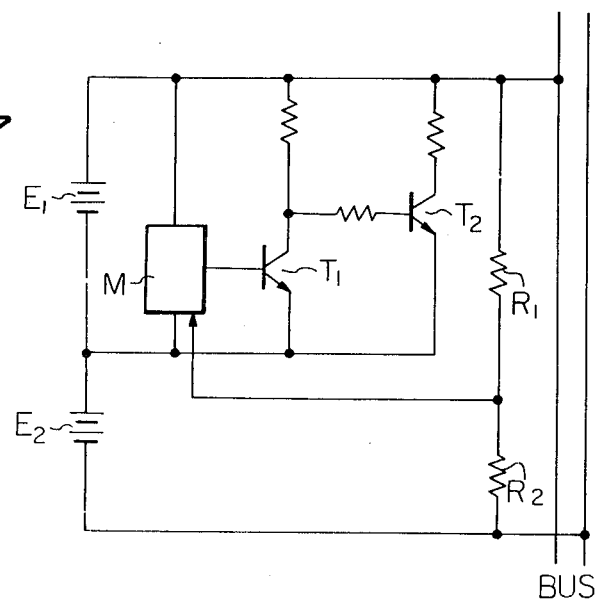
Figures 20A, 20B:
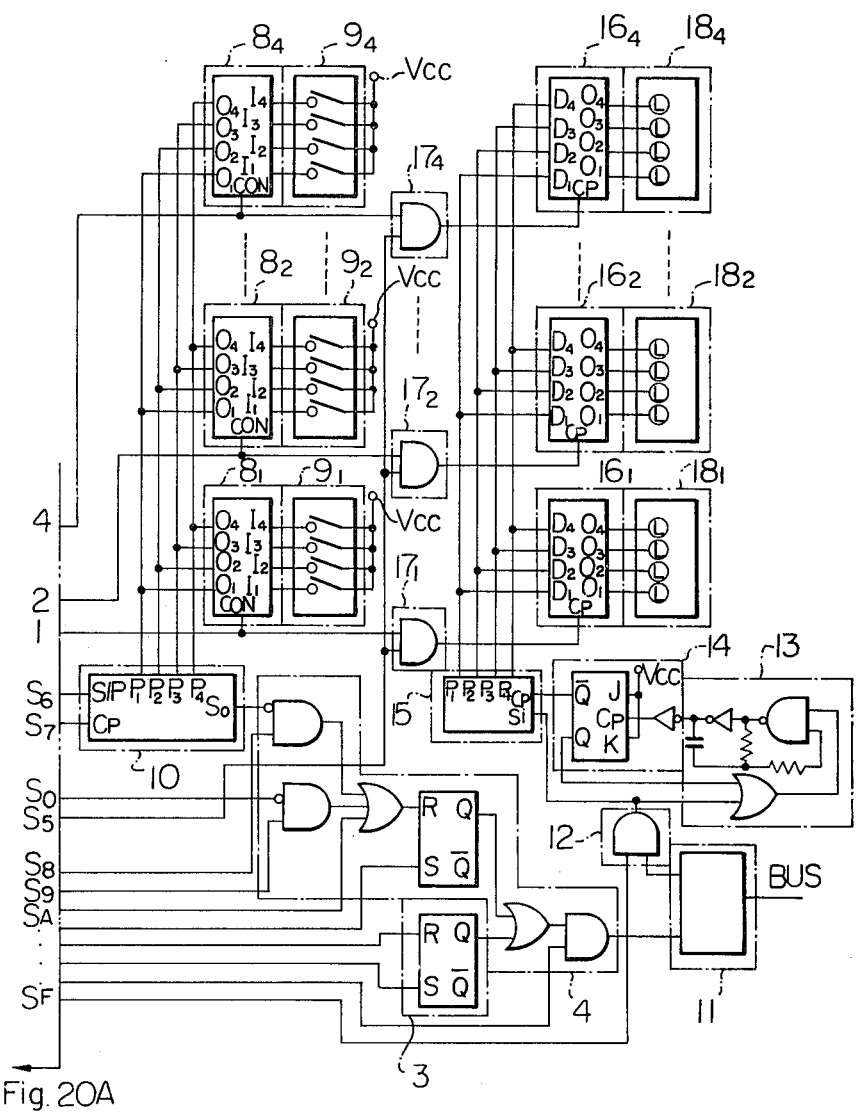
Figure 21:
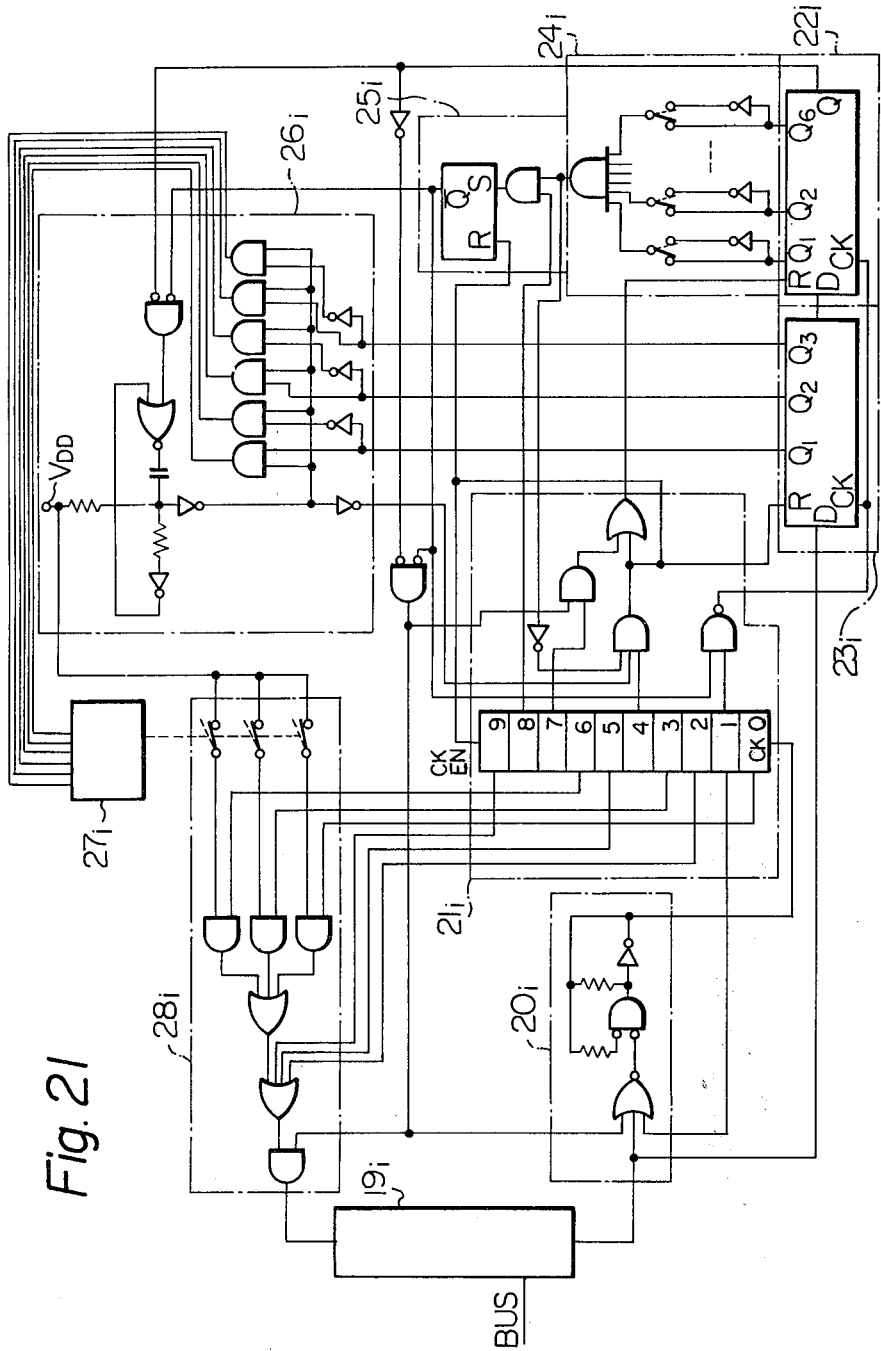

in the signal $\$_i$ of the first embodiment, specifically in the aspect of FIG. 2;

FIG. 4 is a signal wave form diagram of a third embodiment of the present invention, wherein a normally polarized direct current voltage is superposed on the signal $\$_i$ in the first embodiment of the aspect of FIG. 2;

FIG. 5 is a similar diagram of a fourth embodiment of the present invention wherein, in the period of transmitting a response signal to the central unit from the i-th terminal unit in the signal $\$_i$, a voltage signal $R_{ij}$ of the same polarity as the signal $P_{ij}$, $\bar{P}_{ij}$ is fed from the central unit to the terminal unit so as to form the response signal with a current signal;

FIG. 6 is also a similar diagram of a fifth embodiment of the present invention wherein a voltage fed from the central unit to the terminal unit during the period of transmitting the response signal in the fourth embodiment shown in FIG. 5 is individually given to each signal $Q_{ij}$ in the particular response signal;

FIG. 7 is a further similar diagram of a sixth embodiment of the present invention wherein, even during the period of transmitting the response signal from the terminal unit to the central unit in the second embodiment shown in FIG. 3, a direct current voltage of the polarity reverse to the signal $P_{ij}, \bar{P}_{ij}$ is fed from the central unit to the terminal unit so as to form the response signal with a current signal;

FIG. 8 is another similar diagram of a seventh embodiment of the present invention wherein, in the first embodiment shown in FIG. 2, another signal $P_{ij}*$ which is of the reverse polarity to the signal $P_{ij}$ and is the same in the magnitude is arranged between the signal $P_{ij}$ and $P_{ij+1}$ transmitted from the central unit to the terminal unit and another signal $\overline{P}_{ij'}*$ which is reverse polarized to but of the same magnitude as the signal $\overline{P}_{ij'}$ is disposed between the signals $\overline{P}_{ij'}$ and $\overline{P}_{ij'+1}$ on the same line;

FIG. 9 is also another similar diagram of an eighth embodiment of the present invention wherein, in the seventh embodiment shown in FIG. 8 and during the period of transmitting the response signal from the terminal unit to the central unit in the signal $\$_i$, a voltage signal $R_i$ of the same polarity as the signal $P_{ij}\overline{P}_{ij'}$ and a voltage signal $R_i*$ reverse polarized but of the same magnitude as the voltage signal $R_i$ are fed from the central unit to the terminal unit so as to form the response signal with a current signal;

FIG. 10 is a block diagram showing a basic wiring between a central control unit A and a plurality of terminal units $B_i(i = 1, 2, \ldots l)$ to which the first to eighth embodiments of the present invention are applicable;

FIG. 11 is a block diagram showing an example of circuit formation of the central control unit A employed in the diagram of FIG. 10;

FIG. 12 is a block diagram showing an example of circuit arrangement of the terminal unit $B_i$ in FIG. 10;

FIG. 13 is a circuit diagram showing an embodiment of combining circuit 11 in the central unit A of FIG. 11, in which other parts of the unit are indicated by a block M;

FIG. 14A is a circuit diagram showing an embodiment of a receiving circuit part of combining circuit $19_i$ in the terminal unit shown in FIG. 12, in which other parts of the unit are indicated by a block N';

FIG. 14B is a circuit diagram showing more in detail the combining circuit $19_i$ of FIG. 14A as associated with an operating circuit $27_i$ of the terminal unit in FIG. 12, with other parts of the unit indicated by a block N', which is adapted to transmit responsive signals as a voltage signal;

FIG. 14C is a circuit diagram similar to FIG. 14B and showing the combining circuit $19_i$ with the operating circuit $27_i$ shown in FIG. 14B as adapted to transmit the responsive signal as a current signal;

FIG. 15 is a circuit diagram showing another embodiment of the combining circuit 11 in the central unit A of FIG. 11, which is adapted to transmit signals different from those in the case of FIG. 13;

FIG. 16A is a circuit diagram showing a further embodiment of the combining circuit $19_i$ in the terminal unit $B_i$ of FIG. 12, which is controllable even with signals different from those in the case of FIG. 14A;

FIG. 16B is a circuit diagram showing more in detail the combining circuit $19_i$ of FIG. 16A as associated with the operating circuit $27_i$, with other parts of the terminal unit indicated by a block N', which is adapted to transmit the responsive signals as a voltage signal;

FIG. 16C is a circuit diagram similar to FIG. 16B and showing the combining circuit $19_i$ with the operating circuit $27_i$ of FIG. 16B as adapted to transmit the responsive signal as a current signal;

FIG. 17 is a circuit diagram showing a further embodiment of the combining circuit 11 in the central unit A of FIG. 11, which is adapted to transmit signals different from those in the cases of FIGS. 13 and 15;

FIG. 18 is a circuit diagram showing yet another embodiment of the combining circuit 11 in the central unit A of FIG. 11, which is adapted to transmit siganls different from those in the cases of FIGS. 13, 15 and 17;

FIG. 19 is a circuit diagram showing a further embodiment of the combining circuit $19_i$ in the terminal unit $B_i$ of FIG. 12, of which connection wiring to the transmission bus lines can be made optionally as being different from the cases of FIGS. 14 and 16;

FIGS. 20A and 20B show jointly a circuit diagram of another practical embodiment of the central unit A shown in FIG. 11, which is adapted to be operated with the signal shown in FIG. 5; and FIG. 21 is a circuit diagram showing another practical embodiment of the terminal unit $B_i$ shown in FIG. 12, which is adapted to be operated with the signal shown in FIG. 5.

Referring now to FIG. 10, the signal $ appears in the bus lines connecting between the central unit A and the respective terminal units $B_i(i = 1, 2, \ldots l)$ in a predetermined cycle. This signal $ comprises a signal $\$_i$ allotted to the i-th terminal unit $B_i$, whereas the signal $\$_i$ comprises generally a signal $P_{ij}, \overline{P}_{ij'}$ (j = 0, 1, 2, ... k, j' = 1, 2, ..., mi) transmitted from the central unit A to the terminal unit $B_i$ and a signal $Q_{ij'}$ (j' = 1, 2, ... mi) transmitted from the terminal unit $B_i$ to the central unit A.

The operation of the circuit in FIG. 10 employed in the system according to the present invention shall be referred briefly with reference to FIGS. 11 and 12.

In the central control unit A of FIG. 11, an output pulse from a clock pulse generating circuit 1 is provided to a synchronizing signal circuit 2, and an output of this circuit 2 is presented to a starting pulse generating circuit 3, wherein the output is converted to a starting pulse $P_{i,o}$ (i = 1, 2, 3, ... l) which is provided to a signal summing circuit 4. Another output of the synchronizing signal circuit 2 is provided, on the other hand, to an address selecting circuit 5 and this circuit 5 presents signals indicating the first to l-th addresses in sequence to an address signal generating circuit 6 comprising a shift register and to a decoder 7 (the signals may be presented in any desired order but, here, the addresses may be determined in the order of their presentation from the circuit 5 and they are referred to as being presented in sequence, while there may be of course lacking numbers). The address signal generating circuit 6 receives the output of the synchronizing signal circuit 2 as a clock pulse and provides address signals $$\sum_{j=1}^{k} P_{ij}$$

(which shall be $P_{i1} + P_{i2} + \ldots + P_{ik}$ and represent that the respective signals are arranged in this order here and throughout the following descriptions), which are presented to the signal summing circuit 4.

In the decoder 7 referred to above, the output signal accompanying the i-th address from the address selecting circuit 5 is discriminated, an instruction read circuit $8_i$ for the i-th instruction is driven by the thus discriminated output signal and contents of an instruction setting circuit $9_i$ corresponding to the i-th instruction read circuit $8_i$ are read out and presented to a control signal generating circuit 10 comprising a shift register. In the control signal generating circuit 10, a control signal $$\sum_{j=1}^{mi} \overline{P}_{ij}$$

is provided in response to the contents of the instruction setting circuit $9_i$, which signal is presented to the signal summing circuit 4.

In this signal summing circuit 4, signals $$\sum_{j=0}^{k} P_{ij} + \sum_{j=1}^{mi} \overline{P}_{ij}$$

arranged in the order of the starting pulse address signal and the control signal are prepared.

These output signals $$\sum_{j=0}^{k} P_{ij} + \sum_{j=1}^{mi} \overline{P}_{ij}$$

of the signal summing circuit 4 are properly adjusted as shown in FIGS. 1 to 9 in the summing circuit 11 and presented to the bus lines.

After the signals $$\sum_{j=1}^{k} P_{ij} + \sum_{j=1}^{mi'} \overline{P}_{ij}$$

are sent out of the combining circuit 11 to the bus lines, a response signal $$\sum_{j=1}^{mi} Q_{ij}$$

is transmitted to the combining circuit 11 through the bus lines from the terminal unit $B_i$.

The response signal $Q_{ij}$ reaching the combining circuit 11 causes gating in a gate circuit 12 with the output signal of the synchronizing signal circuit 2 so as to receive signals only coming in during the gate opening period and to present the signal $Q_{ij}$ to a clock pulse generating circuit 13, so that a clock pulse which rises in response to the rise of the response signal $Q_{ij}$ will be generated. In a pulse width detecting circuit 14, the pulse width of the response signal $Q_{ij}$ caused to reach the gate circuit 12 by the output pulse of the clock pulse generating circuit 13 is detected and the response signal $Q_{ij}$ is read in turn into a display driving signal generating circuit 15 including a shift register in accordance with the detected width of the signal.

The display driving signal generating circuit 15 properly retains a display retaining circuit $16_i$ in response to the response signals $$\sum_{j=1}^{mi} Q_{ij}.$$

in order to retain the display retaining circuit $16_i$, at this time, there will be necessary a signal given through a gate circuit $17_i$ in case the output of the synchronizing signal circuit 2 and the output of the decoder 7 are present simultaneously. The display retaining circuit $16_i$ drives a succeeding display circuit $18_i$ and displays the contents of each response signal $Q_{ij}$ of the response signal $$\sum_{j=1}^{mi} Q_{ij}$$

by means of lamps or the like.

After the response signal $$\sum_{j=1}^{mi} Q_{ij}$$

is received, the above described operation is again repeated, $$\sum_{j=1}^{k} P_{i+1j} + \sum_{j=1}^{mi} \overline{P}_{i+1j}$$

is transmitted to a terminal unit $B_{i+1}$ and the response signal $$\sum_{j=1}^{mi+1} Q_{i+1j}$$

is received.

In the terminal unit $B_i$ in FIG. 12, the signal $$\sum_{j=1}^{K} P_{ij} + \sum_{j=1}^{MI} \overline{P}_{ij}$$

is transmitted to a combining circuit $19_i$ through the bus lines from the central control unit A. Another succeeding clock pulse generating circuit $20_i$ is driven so that a clock pulse rising in response to the rise of the signals $P_{ij}$ and $\overline{P}_{ij}$ will be generated by the output of the combining circuit $19_i$. In a pulse width detecting circuit $21_i$, the pulse widths of the signals $P_{ij}$ and $\overline{P}_{ij}$ caused to reach the combining circuit $19_i$ by the output pulses of the clock pulse generating circuit $20_i$ are detected and, in accordance with the pulse widths of the signals $P_{ij}$ and $\overline{P}_{ij}$, the signals $P_{ij}$ and $\overline{P}_{ij}$ are read in turn respectively into an address register $22_i$ and control register $23_i$.

The address signal $$\sum_{j=1}^{k} P_{ij}$$

thus stored in the address register $22_i$ is compared with addresses set in a discriminating circuit $24_i$ and, in case it coincides, such address coincidence is stored in an address coincidence memory $25_i$.

When the signals of which addresses are coinciding reach the address coincidence memory $25_i$, a driving circuit $26_i$ is driven in response to the control signal $$\sum_{j=1}^{mi} \overline{P}_{ij}$$

stored in the control register $23_i$. By the thus driven circuit $26_i$, an operating circuit $27_i$ including relays or the like is operated. The state of this operating circuit $27_i$ or other state to be watched or detected is detected with a detecting circuit $28_i$ and the signal $$\sum_{j=1}^{mi} Q_{ij}$$

is prepared and provided to the bus lines through the combining circuit $19_i$.

Therefore, the signal $$\sum_{j=1}^{K} P_{ij} + \sum_{j=1}^{MI} \overline{P}_{ij}$$

transmitted from the central unit A to the terminal unit $B_i$ and the signal $$\sum_{j=1}^{mi} Q_{ij}$$

transmitted from the terminal unit $B_i$ to the central unit A appear in this order in the bus lines and the signal $S_i$ for the i-th address is formed. The signal $$\sum_{j=1}^{K} P_{ij} + \sum_{j=1}^{MI} \overline{Q}_{ij}$$

is sent out to the bus lines in a predetermined cycle to watch and control the terminal unit $B_i$ at all times.

The arrangement, operation and effect in the case of controlling and watching a plurality of the terminal units $B_i$ with the central control unit A in FIG. 10 using the respective signals $S_i$ shown in FIGS. 1 through 9 shall be detailed in the following.

Figure 1:
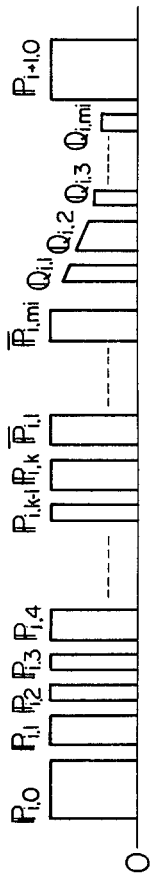
FIGS. 1 and 2 are signal wave form diagrams showing a first embodiment of the time division multiplex transmission system according to the present invention, in the form of two aspects of a signal $\$_i$ allotted to the i-th terminal unit within a signal $\$$ present in the transmission lines.

First of all, the case of utilizing the signal $\$_i$ shown in FIG. 1 shall be referred to. In this case, the central control unit A is formed as shown in FIG. 13, and the signal receiving part and power accumulating part of the terminal unit $B_i$ are formed as shown in FIG. 14.

In FIG. 13, when the output of the signal summing circuit 4 shown in FIG. 11 is given to the base of a transistor $T_1$, for the high level of the output, the transistor $T_1$ will be made ON, transistors $T_2$ and $T_5$ will be OFF and transistors $T_3$ and $T_4$ will be ON so that a source voltage E will be applied across the bus lines but, on the other hand, for the low level of the output of the circuit 4, the transistor $T_1$ will be made OFF, the transistors $T_2$ and $T_5$ will be ON, the transistors $T_3$ and $T_4$ will be OFF and the source voltage E will not be applied to the bus lines. Accordingly, the signal $$\sum_{j=0}^{k} P_{ij} + \sum_{j=1}^{mi} \overline{P}_{ij}$$

in the signals $S_i$ shown in FIG. 1 will be provided to the bus lines.

On the other hand, the signal $$\sum_{j=1}^{mi} Q_{ij}$$

transmitted from the terminal unit $B_i$ will be properly divided by resistances $R_1$ and $R_2$ inserted in series between the respective bus lines and will then be given to the gate circuit 12 in FIG. 11.

In FIG. 14A, when the signal $$\sum_{j=0}^{k} P_{ij} + \sum_{j=1}^{mi} \overline{P}_{ij}$$

reaches the combining circuit $19_i$ in the terminal unit from the central unit A through the bus lines, a condenser $C_{i1}$ will be charged through a circuit of the resistance $R_{i1}$, diode $D_{i1}$ and resistance $R_{i2}$. The electric power with which the condenser $C_{i1}$ is charged will be fed to the clock pulse generating circuit $20_i$, pulse width detecting circuit $21_i$ and so on in the arrangement of FIG. 12.

A series circuit of resistances $R_{i3}$ and $R_{i4}$ is inserted between the respective bus lines through the resistance $R_{i1}$ and the voltage at the connecting point of these resistances $R_{i3}$ and $R_{i4}$ is given to the clock pulse generating circuit $20_i$, control register $23_i$ and address register $22_i$ shown in FIG. 12, through a resistance $R_{i5}$.

By the signal $$\sum_{j=0}^{k} P_{ij} + \sum_{j=1}^{mi} \overline{P}_{ij}$$

transmitted through the bus lines from the central unit A to the terminal unit $B_i$ among the signals $\$_i$ shown in FIG. 1, the electric power required for operating the terminal unit $B_i$ can be also transmitted.

More detailed structure and operation of the terminal unit $B_i$ in the case where the same is adapted to transmit the responsive signal as a voltage signal as shown in FIG. 1 shall now be referred to with reference to FIG. 14B.

In FIG. 14B, as the signal $$\sum_{j=0}^{k} P_{ij} + \sum_{j=0}^{mi} \overline{P}_{ij}$$

from the central unit A reaches the combining circuit $19_i$ of the terminal unit $B_i$ through the bus lines, the charge of the condenser $C_{i1}$ is performed through the circuit of the resistance $R_{i1}$, diode $D_{i1}$ and resistance $R_{i2}$ and, further, a condenser $C_{i2}$ included in the circuit $19_i$ is also charged through a circuit of the resistance $R_{i1}$, diode $D_{i2}$ and resistance $R_{i6}$.

The signal $$\sum_{j=0}^{k} P_{ij} + \sum_{j=0}^{mi} \overline{P}_{ij}$$

is also provided to the address register $22_i$ and control register $23_i$ shown in FIG. 12 through a resistance $R_{i5}$ as voltage-divided by the series connected resistances $R_{i3}$ and $R_{i4}$, after passing through the resistance $R_{i1}$. The signal component $$\sum_{j=0}^{k} P_{ij}$$

provided to the address register $22_i$ is compared with the set address in the discriminating circuit $24_i$ and, in the event of a coincidence therewith, the address coincidence is stored in the address coincidence memory $25_i$. When such address coincidence is stored in the memory $25_i$, contents in the control register $23_i$ are provided through the driving circuit $26_i$ to the transistor $T_{i1}$ or $T_{i2}$ in the operating circuit $27_i$ so that the transistor will be made ON. Upon such ON operation of the transistor $T_{i1}$ or $T_{i2}$, a coil $L_1$ or $L_2$ for making an associated latching relay or the like (not shown) is excited, whereby the latching relay is actuated.

The state of the latching relay is detected by the detecting circuit $28_i$ and, depending on the detected state, a transistor $T_{i3}$ and sequentially a transistor $T_{i4}$ included in the circuit $19_i$ are conducted to be ON, so that the charged voltage in the condenser $C_{i2}$ is applied to the bus lines through the transistor $T_{i4}$, a resistance $R_{i7}$ connected to the emitter of the transistor $T_{i4}$ and further through the resistance $R_{i1}$ and thereby the response signal can be transmitted to the bus lines as the voltage signal.

Here, among the signals $\$_i$ shown in FIG. 1, the response signal $Q_{ij'}$ will gradually reduce in the magnitude with the discharge of the condenser $C_{i1}$ as seen in the drawing, undesirably. In order to prevent such reduction of the response signal $Q_{ij'}$, the magnitude of the response signal $Q_{ij'}$ may be taken properly to be so small as not to be influenced by the discharge of the condenser $C_{i1}$ as shown in FIG. 2 but, in this case, there remains a problem that practical handling of the system becomes somewhat uneasy.

In the present invention, in order to eliminate such problems as above of the embodiment shown in FIGS. 1 and 2, there is employed a transmission system wherein, as shown in FIGS. 3 and 4, a predetermined voltage is applied to the bus lines by the central unit A at least during the period of transmitting the signals from the central unit A to the terminal units $B_i$.

These embodiments of FIGS. 3 and 4 shall be detailed respectively in the followings.

In the case of using such signal as shown in FIG. 3, the central unit A is formed as shown in FIG. 15 and the terminal unit $B_i$ is formed as shown in FIG. 16.

In FIG. 15, when the output of the signal summing circuit 4 as in FIG. 11 is on a low level, the output is given to the emitter of a transistor $T_1$ through a diode $D_1$. In this case, a sufficient voltage difference between the emitter and the base of the transistor cannot be secured and the transistor $T_1$ will be OFF so that a further transistor $T_2$ will be also OFF, but transistors $T_3$, $T_4$ and $T_5$ will be ON, whereas further transistors $T_6$ and $T_7$ will be OFF. Accordingly a source voltage $E_2$ will be applied across the bus lines. On the other hand, when the output of the signal summing circuit 4 is on a high level, the transistors $T_1$ and $T_2$ will be ON, the transistors $T_3$, $T_4$ and $T_5$ will be OFF, the transistors $T_6$ and $T_7$ will be ON and, therefore, a source voltage $E_1$ will be applied across the bus lines. At this time, as the direction of applying the source voltage $E_2$ and that of applying the source voltage $E_1$ are reverse to each other, $$\sum_{j=0}^{k} P_{ij} + \sum_{j=1}^{mi} \overline{P}_{ij}$$

of the signals shown in FIG. 3 will be transmitted from the central unit A to the terminal unit $B_i$.

When the response signal $$\sum_{j=1}^{mi} Q_{ij'}$$

is to be received, as the signal sent from the synchronizing signal circuit 2 to the gate circuit 12 is given to the emitter of the transistor $T_1$ through the diode $D_2$ and further to the base of the transistor $T_8$, the transistors $T_1$ and $T_2$ will be ON, the transistors $T_3$, $T_4$, $T_5$, $T_6$ and $T_7$ will be OFF and the transistor $T_8$ will be ON. Therefore, the response signal $Q_{ij'}$ transmitted through the bus lines will be properly divided by the resistances $R_1$ and $R_2$ inserted between the bus lines and will be given to the gate circuit 12.

In FIG. 16, a diode bridge $BG_i$ is inserted between the bus lines through the resistance $R_{i1}$, a series circuit of the resistance $R_{i2}$ and condenser $C_{i1}$ is inserted between the output ends of the diode bridge $BG_i$, and the electric power of the signal $$\sum_{j=0}^{k} P_{ij} + \sum_{j=1}^{mi} \overline{P}_{ij}$$

transmitted from the central unit A to the condenser $C_{i1}$ is charged therein. The electric power with which the condenser $C_{i1}$ is charged is given to each part of the terminal unit $B_i$ in the same manner as in FIG. 14. A series circuit of resistances $R_{i3}$ and $R_{i4}$ is connected at one end with one of the input terminals of the diode bridge $BG_i$ and at the other end with the other one of the output terminals of the diode bridge $BG_i$. The voltage of the connecting point of the resistances $R_{i3}$ and $R_{i4}$ is given to the clock pulse generating circuit $20_i$, control register $23_i$ and address register $22_i$ through the resistance $R_{i5}$. Therefore, the signal $$\sum_{j=0}^{k} P_{ij} + \sum_{j=1}^{mi} \overline{P}_{ij}$$

will be provided to the clock pulse generating circuit $20_i$, control register $23_i$ and address register $22_i$ through the series circuit of the resistances $R_{i3}$ and $R_{i4}$ and the resistance $R_{i5}$.

As a predetermined voltage of the reverse polarity is superposed on the signal $$\sum_{j=0}^{k} P_{ij} + \sum_{j=1}^{mi} \overline{P}_{ij}$$

transmitted from the central unit A to the terminal unit $B_i$ through the bus lines among the signals $\$_i$ shown in FIG. 3, a sufficient amount of the charge in the condenser $C_{i1}$ in the terminal unit $B_i$ can be well secured, the voltage of the condenser $C_{i1}$ can be maintained at a value high enough during the period of providing and transmitting the response signal $Q_{ij'}$ back to the central unit A from the terminal unit $B_1$ and thus the response signal $Q_{ij'}$ can be made larger.

If, in the above, the magnitude of the predetermined voltage is set to be larger than that of an actually required voltage, the electric power obtained in the terminal unit $B_i$ by the signal $$\sum_{j=0}^{k} P_{ij} + \sum_{j=1}^{mi} \overline{P}_{ij}$$

transmitted to the terminal unit $B_i$ from the central unit A can be used for driving the terminal unit $B_i$ only during the period of sending the response signal $$\sum_{j'=1}^{mi} Q_{ij'}$$

out of the terminal unit $B_i$ to the central unit A and also to form the response signal $Q_{ij'}$. Therefore, the response signal $Q_{ij'}$ can be made much larger than in the case of the embodiments shown in FIGS. 1 and 2.

In the above, additionally, the polarity of the predetermined voltage and that of the signal $$\sum_{j=0}^{k} P_{ij} + \sum_{j'=1}^{mi} \overline{P}_{ij'}$$

may be the same.

References shall now be made to a case of utilizing the signal $\$_i$ shown in FIG. 4. In this case, the central unit A is formed as shown in FIG. 17, while the terminal unit $B_i$ of the same structure as in FIG. 16 is used.

In the central unit of FIG. 17, when the output of the signal summing circuit 4 is on the high level, the transistor $T_1$ will be ON, whereas the transistor $T_2$ will be OFF and the source voltages $E_1$ and $E_2$ will be applied across the bus lines. On the other hand, when the output of the signal summing circuit 4 is on the low level, the transistor $T_1$ will be OFF whereas the transistor $T_2$ will be ON and only the source voltage $E_2$ will be applied to the bus lines.

That is to say, during all the operation, a predetermined voltage is applied to the bus lines from the central unit A, the signal $$\sum_{j=0}^{k} P_{ij} + \sum_{j'=1}^{mi} \overline{P}_{ij'}$$

of FIG. 14 is transmitted from the central unit A to the terminal unit $B_i$ and then the response signal $$\sum_{j'=1}^{mi} Q_{ij'}$$

is transmitted back from the terminal unit $B_i$ to the central unit A.

The response signal $Q_{ij'}$ is divided by the resistances $R_1$ and $R_2$ inserted between the bus lines and is given to the gate circuit 12.

With reference to the terminal unit, the foregoing descriptions on FIG. 16 should be referred to.

Now, as a predetermined voltage is applied by the central unit A to the terminal unit $B_i$ at all times during the operation as shown by the signal $\$_i$ of FIG. 4, if the magnitude of the predetermined voltage is set to be above the voltage actually required for the terminal unit $B_i$, the electric power obtained in the terminal unit $B_i$ depending on the signal $$\sum_{j=0}^{k} P_{ij} + \sum_{j'=1}^{mi} \overline{P}_{ij'}$$

transmitted from the central unit A to the terminal unit $B_i$ can be used only to form the response signal $$\sum_{j'=1}^{mi} Q_{ij'}$$

and the magnitude of the response signal can be secured sufficiently as compared with the embodiments of FIGS. 1 to 3.

Considering here the embodiments in FIGS. 1 to 4, it is found that there still remains a fear that, in case the bus lines are of extensive length, the response signal transmitted from the terminal unit $B_i$ to the central unit A will become feeble. In order to eliminate this fear, further, the present invention adopts a system wherein, as shown in FIGS. 5 to 7, at least during the period of transmitting the response signal from the terminal unit $B_i$ to the central unit A, a predetermined voltage is applied to the bus lines by the central unit A and the signal from the terminal unit $B_i$ to the central unit A is transmitted in the form of a current signal. The respective embodiments of FIGS. 5 to 7 shall be referred to in turn in the following.

In the case of utilizing the signal $S_i$ shown in FIG. 5, the central unit A is formed as shown in FIG. 13 and the terminal unit $B_i$ is formed as shown in FIG. 14A, basically. In these drawings, other parts than those illustrated are indicated by a block M or N, for details of which FIG. 11 or 12 should be referred to.

In FIG. 13, the base of the transistor $T_1$ is connected to the output terminal of the signal summing circuit 4 through a diode and is further connected through another diode to the output terminal of a synchronizing signal circuit 2 connected to a gate circuit 12. Thus, when a high level signal enters the base of the transistor $T_i$, the transistor $T_i$ will be ON, the transistor $T_2$ will be OFF, and the transistors $T_3$, $T_4$ and $T_5$ will be ON, so that a source voltage E will be impressed between the bus lines and thereby the signal $$\sum_{j=0}^{k} P_{ij} + \sum_{j'=1}^{mi} \overline{P}_{ij'} + R_i$$

shown in FIG. 5 will be transmitted to the terminal unit $B_i$.

On the other hand, in the terminal unit $B_i$ shown in FIG. 14A, the response signal $Q_{ij'}$ (j' = 1, ... mi) is produced by properly short-circuiting the bus lines with the detecting circuit $28_i$. In the central unit A, the connecting point of the resistances $R_1$ and $R_2$ inserted between the bus lines may be connected to the input terminal of the gate circuit 12 through an inverter.

The signal $$\sum_{j=0}^{k} P_{ij} + \sum_{j'=1}^{mi} \overline{P}_{ij'} + R_i$$

shown in FIG. 5 is sent out of the central unit A to the bus lines, the condenser $C_{i1}$ is charged with such electric power accompanying the signal $$\sum_{j=0}^{k} P_{ij} + \sum_{j'=1}^{mi} \overline{P}_{ij'} + R_i$$

in the terminal unit $B_i$, a required electric power is sent to each part of the terminal unit $B_i$, and further the response signal is sent out of the terminal unit $B_i$ as a current signal during the period in which the signal $R_i$ is being impressed on the bus lines, so that a sufficient response signal can be transmitted even in the long extended bus lines.

A more detailed arrangement and operation of the terminal unit $B_i$ in the case where the unit is adapted to transmit the response signal as the current signal, as shown in FIG. 5, shall be explained with reference to FIG. 14C.

In FIG. 14C, when the signal $$\sum_{j=0}^{k} \mathbb{P}_{ij} + \sum_{j=1}^{mi} \overline{\mathbb{P}}_{ij}$$

from the central unit A reaches the terminal unit $B_i$ through the bus lines, the condenser $C_{i1}$ is charged through the circuit of the resistance $R_{i1}$, diode $D_{i1}$, resistance $R_{i2}$ and condenser $C_{i1}$ and, further, the condenser $C_{i2}$ is charged through the circuit of the resistance $R_{i1}$, diode $D_{i2}$, resistance $R_{i6}$ and condenser $C_{i2}$.

Further, the signal $$\sum_{j=1}^{K} \mathbb{P}_{ij} + \sum_{j=1}^{MI} \overline{\mathbb{P}}_{ij}$$

is provided, after passing through the resistance $R_{ij}$ and being voltage-divided by the resistances $R_{i3}$ and $R_{i4}$, to the address register $22_i$ and control register $23_i$ through the resistance $R_{i5}$. The signal $$\sum_{j=1}^{k} \mathbb{P}_{ij}$$

provided to the address register $22_i$ is compared with an address set in the discriminating circuit $24_i$ and, in the event when they coincide with one another, such address coincidence is stored in the address coincidence memory $25_i$. Upon the storage of the address coincidence in the memory $25_i$, contents in the control register $23_i$ are presented through the driving circuit $26_i$ to the transistor $T_{i1}$ or $T_{i2}$ of the operating circuit $27_i$ so that the transistor $T_{i1}$ or $T_{i2}$ will be made ON, upon which the coil $L_1$ or $L_2$ for making the associated latching relay or the like to be ON is excited so as to actuate the relay.

The state of the latching relay is detected by the detecting circuit $28_i$ and, depending on thus detected state of the relay, the transistor $T_{i3}$ is conducted to be ON to short-circuit the bus lines, whereby the response signal can be transmitted to the bus lines as the current signal.

Practical examples of circuit arrangement to which the embodiment of FIG. 5 is applicable are shown in FIGS. 20 and 21, wherein FIG. 20 shows the example of the central unit A with reference symbols corresponding to those in FIG. 11 and FIG. 21 shows the example of the terminal unit $B_i$ with reference symbols corresponding to those in FIG. 12.

In the case of utilizing the signal $S_i$ shown in FIG. 6, the central unit A as well as the signal receiving part of combining circuit $19_i$ of the terminal unit $B_i$ are basically formed to have such arrangements as shown in FIGS. 13 and 14A, respectively.

In FIG. 13, the base of the transistor $T_1$ is connected to the output terminal of the signal summing circuit 4 through a diode and is further connected through a NAND gate to the output terminal of the synchronizing signal circuit 2 connected to the gate circuit 12. When the output of the clock generating circuit 1 is properly divided and is given to the other input terminal of the NAND gate, as will be evident from the foregoing disclosures, the signal $$\sum_{j=0}^{k} \mathbb{P}_{ij} + \sum_{j=1}^{mi} \overline{\mathbb{P}}_{ij} + \sum_{j=1}^{mi} \mathbb{R}_{ij}$$

will be sent out of the central unit A to the terminal unit $B_i$, as shown in FIG. 6. Thereafter, the same operation as in the embodiment of FIG. 5 will be performed.

In the embodiments shown in FIGS. 5 and 6, as the terminal unit $B_i$ is charged with the electric power accompanying the pulse-shaped signals transmitted from the central unit A to be used in the unit $B_i$, there is a problem that, in case the pulse intervals are large, the required voltage is unable to obtain. Therefore, in the embodiment shown in FIG. 7 according to the present invention, a predetermined voltage required is constantly applied from the central unit A to the bus lines to well secure the operation of the terminal units. This feature shall be detailed in the following.

In the case of utilizing the signal $\$_i$ shown in FIG. 7, the central unit A is formed to have such arrangement as shown in FIG. 18 and the terminal unit $B_i$ is formed as shown in FIG. 16, basically.

In FIG. 18, when the output of the signal summing circuit 4 of the central unit A is on a low level, this output given to the emitter of the transistor $T_1$ through the diode $D_1$ is unable to attain a sufficient voltage difference at the emitter and base of the transistor $T_1$ and this transistor will remain OFF. Thus the transistor $T_2$ will be OFF, consequently the transistors $T_3$, $T_4$ and $T_5$ will be ON, further the transistors $T_6$ and $T_7$ will be OFF and, therefore, a source voltage $E_2$ will be applied to the bus lines. When the output of the signal summing circuit 4 is on a high level, on the other hand, the transistors $T_1$ and $T_2$ will be ON, the transistors $T_3$, $T_4$ and $T_5$ will be OFF, the transistors $T_6$ and $T_7$ will be ON and, therefore, a source voltage $E_1$ will be applied to the bus lines. At this time, the applied direction of the source voltage $E_1$ is reverse to that of the source voltage $E_2$ and the signal $$\sum_{j=0}^{k^1} \mathbb{P}_{ij} + \sum_{j=1}^{mi} \overline{\mathbb{P}}_{ij}$$

shown in FIG. 7 will be transmitted from the central unit A to the terminal unit $B_i$.

When the response signal $$\sum_{j=1}^{mi} \mathbb{P}_{ij}$$

is received at the central unit A, the output of the signal summing circuit 4 will be on a low level and, therefore, as evident from the above, the source voltage $E_2$ will be applied to the bus lines.

On the other hand, in the terminal unit $B_i$ shown in FIG. 16, the same as in the embodiments in FIGS. 5 and 6, the response signal $Q_{ij'}$ (j' = 1, 2, ..., mi) is produced by short-circuiting properly the bus lines with the detecting circuit $28_i$ in the same manner as the embodiments of FIGS. 5 and 6. Therefore, as shown in FIG. 7, the response signal $Q_{ij'}$ can be transmitted by the current signal from the terminal unit $B_i$ to the central unit A through the bus lines. In the central unit A, the connecting point of the resistances $R_1$ and $R_2$ inserted between the bus lines may be connected to the input end of the gate circuit 12 through an inverter.

More detailed arrangement and operation of the terminal unit $B_i$ in the case when the unit is adapted to transmit the response signal as the current signal as shown in FIG. 7 shall be referred to next with reference to FIG. 16B.

In the drawing, when the signal $$\sum_{j=0}^{k} P_{ij} + \sum_{j=1}^{mi} \overline{P}_{ij}$$

from the central unit A reaches the terminal unit $B_1$ through the bus lines, the signal passes through a circuit of the resistance $R_{i1}$, diode bridge $BG_i$, resistance $R_{i2}$ and condenser $C_{i1}$ to charge the condenser $C_{i1}$ and further through a circuit of the resistance $R_{i1}$, diode bridge $BG_i$, resistance $R_{i6}$ and condenser $C_{i2}$ to charge the condenser $C_{i2}$.

Further, the signal $$\sum_{j=1}^{k} P_{ij} + \sum_{j=1}^{mi'} \overline{P}_{ij}$$

is, after passing through the resistance $R_{i1}$, voltage-divided by the resistances $R_{i3}$ and $R_{i4}$ and is provided to the address register $22_i$ and control register $23_i$ through the resistance $R_{i5}$. The signal $$\sum_{j=1}^{k} P_{ij}$$

provided to the address register $22_i$ is compared with the address set in the discriminating circuit $24_i$ and, upon their coincidence, the address coincidence is stored in the address coincidence memory $25_i$, upon which the contents in the control register $23_i$ are presented through the driving circuit $26_i$ to the transistor $T_{i1}$ or $T_{i2}$ in the operating circuit $27_i$ so as to conduct the transistor to be ON. Upon such ON operation of the transistor $T_{i1}$ or $T_{i2}$, the coil $L_1$ or $L_2$ for actuating the associated latching relay or the like is excited, whereby the relay is actuated.

The state of the relay is detected by the detecting circuit $28_i$ to render the transistor $T_{i3}$ to be ON depending on the thus detected state of the relay, so that the input side and output side of the diode bridge $BG_i$ will be short-circuited, thereby the response signal can be transmitted to the bus lines as the current signal.

While in the above descriptions only the case where the central unit A of the basic arrangement shown in FIG. 13 is combined with the terminal unit $B_i$ of the basic arrangement shown in FIG. 14A has been referred to, it should be appreciated that the terminal unit $B_i$ shown in FIG. 16A may be employed.

In the embodiments shown in FIGS. 1 to 7, the wiring polarity of the terminal unit $B_i$ to the bus lines has been shown as being primarily determined, which may cause a miswiring to occur and working efficiency somewhat to become hard to improve. In order to prevent such respects from occurring, the terminal unit $B_i$ may be formed as in FIG. 19.

It will be also appreciated that, if the terminal unit $B_i$ is basically formed as in FIG. 19, the central unit A may take such type of arrangements as shown in FIGS. 13, 15, 17 and 18. In this case, specifically in FIGS. 15 and 18, the source voltages $E_1$ and $E_2$ should be made to be $E_1 >> E_2$ for detecting the transmission signal.

The terminal unit $B_i$ in FIG. 19 is formed as follows. That is, in the arrangement of FIG. 16A, a diode $D_{i1}$ may be inserted between an end of the series circuit of the resistances $R_{i3}$ and $R_{i4}$ and an input terminal of the diode bridge $BG_i$ and, further, a diode $D_{i2}$ may be inserted between the connecting point of the series circuit of the resistances with the diode $D_{i1}$ and the other input terminal of the diode bridge $BG_i$. Further, with the response signal transmitted from the terminal unit $B_i$ in the above described manner, the respective signals shown in FIGS. 1 to 7 can be properly used.

In the event where the terminal unit $B_i$ is formed to be of such arrangement as in FIG. 19, however, there arises an inconvenience that the source voltages $E_1$ and $E_2$ from the central unit A must be made to be $E_1 >> E_2$ in order to receive the transmission signals from the central unit A, that is, in order to obtain any variation component of the signal voltage at both ends of the resistance $R_{i4}$ in the arrangement of FIG. 19, whereby the electric power provided from the central unit A to the terminal unit $B_i$ is caused to become small. If the source voltages $E_1$ and $E_2$ are made to be of the same level, on the other hand, the wiring connection of the terminal unit $B_i$ with the bus lines will require the polarity restriction, but such requirement is not desirable in view of possible miswiring troubles due to the polarity restriction.

In order to eliminate such inconvenience, another embodiment employing the signal $\$_i$ shown in FIG. 8 is suggested, as will be referred to in the followings. In this case, basically, the central unit A and terminal unit $B_i$ should be formed to have such arrangements as shown in FIGS. 15 and 16A, respectively.

In FIG. 15, as the output signal of the signal summing circuit 4 in the central unit A, the signal $$\sum_{j=0}^{k} P_{ij} + \sum_{j=1}^{mi} \overline{P}_{ij}$$

which comprising the signal on the upper side of FIG. 8, that is, the transmitting pulse and transmission signal formed to have alternate rest periods of the same width as the transmitting pulse, is given through a diode to the diode $D_1$ and transistor $T_6$ in FIG. 15. If in this case, further, the source voltages $E_1$ and $E_2$ are made to be of an equal value, it is possible to produce the signal $$\sum_{j=0}^{k} (P_{ij} + P_{ij}^*) + \sum_{j'=1}^{mi} (\overline{P}_{ij'} + \overline{P}_{ij'}^*)$$

shown in FIG. 8.

In the terminal unit $B_i$, the response signal is produced and transmitted to the bus line in the same manner as in the embodiments shown in FIGS. 1 to 4.

Other operations of the central unit A and terminal unit $B_i$ are the same as has been described in the foregoing.

A more detailed arrangement of the terminal unit $B_1$ and its operation in the case where the response signal is transmitted as the voltage signal as shown in FIG. 8 shall now be referred to in the following with reference to FIG. 16C.

In FIG. 16C, upon receiving at the terminal unit $B_i$ a signal $$\left\{ \sum_{j=0}^{k} (P_{ij} + P^*_{ij}) + \sum_{j=1}^{mi} (\overline{P}_{ij} + \overline{P}^*_{ij}) \right\}$$

from the central unit A, the signal is passed through a circuit of the resistance $R_{i1}$, diode bridge $BG_i$, resistance $R_{i2}$ and condenser $C_{i1}$ to charge the condenser $C_{i1}$ and further through a circuit of the resistance $R_{i1}$, diode bridge $BG_i$, resistance $R_{i6}$ and condenser $C_{i2}$ to charge the condenser $C_{i2}$.

Further, after passing through the resistance $R_{i1}$, the signal $$\left\{ \sum_{j=0}^{k} (P_{ij} + P^*_{ij}) + \sum_{j=1}^{mi} (\overline{P}_{ij} + \overline{P}^*_{ij}) \right\}$$

is voltage-divided by the series connected resistances $R_{i3}$ and $R_{i4}$ so as to be provided through the resistance $R_{i5}$ to the address register $22_i$ and control register $23_i$. At this time, the signal to be stored in the address register $22_i$ and control register $23_i$ is one of $$\left( \sum_{j=1}^{k} P_{ij} + \sum_{j=1}^{mi} \overline{P}_{ij} \right)$$

and $$\left( \sum_{j=1}^{k} P^*_{ij} + \sum_{j=1}^{mi} \overline{P}^*_{ij} \right).$$

Here, the reference shall be made with respect to the case where the former, that is, $$\left( \sum_{j=1}^{k} P_{ij} + \sum_{j=1}^{mi} \overline{P}_{ij} \right)$$

is to be stored. The signal $$\sum_{j=1}^{k} P_{ij}$$

given to the address register $22_i$ is compared with an address set in the discriminating circuit $24_i$ and, upon their coincidence, the address coincidence is stored in the address coincidence memory $25_i$, upon which the contents in the control register $23_i$ are presented through the driving circuit $26_i$ to the transistor $T_{i1}$ or $T_{i2}$ to render it to be ON. Due to this ON operation of the transistor $T_{i1}$ or $T_{i2}$, the coil $L_1$ or $L_2$ in the circuit $27_i$ for actuating the associated latching relay or the like is excited to actuate the relay.

The detecting circuit $28_i$ detects the state of the latching relay or the like, the transistor $T_{i3}$ and consequently the transistors $T_{i4}$ and $T_{i5}$ are made ON depending to the thus detected state of the relay, so that the condenser $C_{i2}$ will be discharged and thus discharged voltage is provided to both ends on the input side of the diode bridge $BG_i$, thereby the response signal can be transmitted as the voltage signal from the terminal unit $B_i$ onto the bus lines.

In the embodiment of FIG. 8, the terminal unit $B_i$ is required to operate only with the charged voltage during the period of transmitting the response signal so that the response signal is unable to be made large and, in the case of using long bus lines, the response signal may happen to become attenuated while being transmitted through such long bus lines. In order to eliminate such undesirable inconvenience, the further embodiment of FIG. 9 is suggested according to the present invention.

In this case, the central unit A is formed basically as shown in FIG. 15 but modified to be of the formation explained with reference to FIG. 8 with further modifications as will be explained in the following. For the terminal unit $B_i$, the arrangement of FIG. 16A is employed.

In FIG. 15 as modified in particular in accordance with the embodiment of FIG. 8, the output terminal of the synchronizing signal circuit 2 connected to the gate circuit 12 is further connected to the base of the transistor connected to the output terminal of the signal summing circuit 4, then the signal $$\left\{ \sum_{j=0}^{k} (P_{ij} + P^*_{ij}) + \sum_{j=1}^{mi} (\overline{P}_{ij} + \overline{P}^*_{ij}) + (R_i + R_i^*) \right\}$$

shown in FIG. 9 will be transmitted from the central unit A to the terminal unit $B_i$.

In the terminal unit $B_i$, the bus lines are short-circuited with each other in the same manner as in the embodiments of FIGS. 5 through 7, so that the response signal $$\sum_{j=1}^{mi} P_{ij}$$

will be able to be transmitted to the central unit A in the form of the current signal.

Other operations of the central unit A and terminal unit $B_i$ are the same as described before.

In the case of the embodiment of FIG. 9, a certain signal is being constantly transmitted from the central unit A to the bus lines and, further, this signal is non-polarized. Therefore, the arrangement involves no troubles such as miswiring or the like. In addition, the response signal from the terminal unit $B_i$ is a current signal so that the system can be used with the long extended bus lines. Consequently, a power transmission from the central unit to the terminal units can be performed at a remarkably high efficiency almost over the entire operation period and a signal transmission system of an excellent operational efficiency can be provided.

It should be noted that, in the respective embodiments shown in FIGS. 1 through 9, the address signal $$\sum_{j=1}^{k} P_{ij}$$

may be formed of only one pulse so that, when the number of pulses from the first to the i-th in the above, that is, "i" is counted in the terminal unit $B_i$, the control signal $$\sum_{j=1}^{mi} \overline{P}_{ij}$$

following the i-th pulse will be read in and the contents of the control signal $$\sum_{j=1}^{mi} \overline{q}_{ij}$$

will be processed.

What is claimed is:

1. In a time division multiplex transmission system including a central unit and a plurality of terminal units, said central unit transmitting at least address signals and control signals respectively in a set sequentially to respective ones of said terminal units, each of said terminal units responding to a corresponding address signal which accompanies each control signal and receiving said control signal to be thereby controlled and transmitting to the central unit a response signal in accordance with the control signal, and said address, control and response signals being arranged as time-divided in a series time band; an arrangement in which said terminal units are respectively provided with means for accumulating therein an electric power required for operating the terminal unit and supplying said accumulated power to the terminal unit, said electrical power being transmitted from the central unit accompanying at least the address and control signals, wherein a direct current voltage higher than a required voltage for each terminal unit is transmitted from the central unit as superposed at least on the address and control signals and at least during the period of transmitting the signals.

2. In a time division multiplex transmission system including a central unit and a plurality of terminal units, said central unit transmitting at least address signals and control signals respectively in a set sequentially to respective ones of said terminal units, each of said terminal units responding to a corresponding address signal which accompanies each control signal and receiving said control signal to be thereby controlled and transmitting to the central unit a response signal in accordance with the control signal, and said address, control and response signals being arranged as time-divided in a series time band; an arrangement in which said terminal units are respectively provided with means for accumulating therein an electric power required for operating the terminal unit and supplying said accumulated power to the terminal unit, said electric power being transmitted from the central unit accompanying at least the address and control signals, wherein a predetermined voltage signal is transmitted from the central unit to a respective terminal unit also during transmissions of the response signals from the respective terminal units, the response signal is transmitted in the form of a current signal by short-circuiting and opening a circuit of the respective terminal units, and said electric power accumulating means accumulates the power also during transmissions of the response signals.

3. In a time division multiplex transmission system including a central unit and a plurality of terminal units, said central unit transmitting at least address signals and control signals respectively in a set sequentially to respective ones of said terminal units, each of said terminal units reponding to a corresponding address signal which accompanies each control signal and receiving said control signal to be thereby controlled and transmitting to the central unit a response signal in accordance with the control signal, and said address, control and response signals being arranged as time-divided in a series time band; an arrangement in which said terminal units are respectively provided with means for accumulating therein an electric power required for operating the terminal unit and supplying accumulated power to the terminal unit, said electric power being transmitted from the central unit accompanying at least the address and control signals, wherein a direct current voltage higher than a required voltage for each terminal unit is transmitted from the central unit as superposed at least on the address and control signals and at least during the period of transmitting the signals, further wherein a predetermined voltage signal is transmitted from the central unit to the terminal unit also during the transmission of the response signal from the respective terminal units, the response signal is transmitted in the form of a current signal by short-circuiting and opening a circuit of the respective terminal units, and said electric power accumulating means accumulates the power also during transmissions of the response signals.

4. In a time division multiplex transmission system including a central unit and a plurality of terminal units, said central unit transmitting at least address signals and control signals respectively in a set sequentially to respective ones of said terminal units, each of said terminal units which corresponds to each address signal which accompanies each control signal receiving said control signal to be thereby controlled and transmitting to the central unit a response signal in accordance with the control signal, and said address, control and response signals being arranged as time-divided in a series time band; an arrangement in which said terminal units are respectively provided with means for accumulating therein an electric power required for operating the terminal unit and supplying said power accumulated to the terminal unit, said electric power being transmitted from the central unit accompanying at least the address and control signal, wherein at least the address and control signals transmitted from the central unit are respectively formed by arranging pulses alternately different in polarity, and substantially two trains of the address and control signals equal in contents but different only in the polarity are transmitted.

5. A system according to claim 4 wherein a predetermined voltage signal of one polarity is transmitted from the central unit also during the transmission of the response signal and thereafter another voltage signal of the same magnitude as but of the opposite polarity to said predetermined voltage signal is transmitted so that a circuit of the respective terminal units is short-circuited and opened and thereby the response signal is transmitted from the terminal units.

6. A system according to claim 5 wherein the electric power included in the signals transmitted from the central unit is accumulated in the power accumulating means in the respective terminal units by means of a full-wave rectification, and the address, control and the like signals included in said transmitted signals are provided to following circuits without being subjected to the full-wave rectification.

7. In a time division multiplex transmission apparatus comprising a central unit and a plurality of terminal units respectively connected to said central unit through a pair of bus lines, address and control signals respectively corresponding to said terminal units being transmitted sequentially in series from the central unit to the respective terminal units, and response signals being transmitted from the respective terminal units during periods between the preceding control signals and the following address signals; an arrangement in which said central unit comprises (a) a clock pulse generating circuit,
(b) a synchronizing signal circuit which receives output pulses from said clock pulse generating circuit,
(c) a start pulse generator which receives a first output signal from said synchronizing signal circuit to generate a start pulse,
(d) an address selecting circuit which receives a second output signal from the synchronizing signal circuit to select addresses,
(e) an address signal generating circuit which generates address signals from an output signal of said address selecting circuit responsive to a third output signal of the synchronizing signal circuit,
(f) a decoder for decoding the output signal of the address selecting circuit,
(g) an instruction setting circuit for setting instructions for the terminal units,
(h) an instruction reading circuit for reading contents of said instruction setting circuit which are corresponding to the addresses decoded by said decoder,
(i) a control signal generating circuit for generating control signals depending on the contents read by said instruction reading circuit in response to a fourth output signal of the synchronizing signal circuit,
(j) a signal summing circuit for arranging said start pulses, address signals and control signals in a predetermined order responsive to a fifth output signal of the synchronizing signal circuit,
(k) a combining circuit for providing output signals of said signal summing circuit to the bus lines and receiving through the bus lines said response signals from the terminal units,
(l) indicating circuits corresponding to the terminal units, and
(m) a driving circuit for driving said indicating circuits depending on the contents of the response signals received by said combining circuit;
and said terminal units respectively comprise
(a') a combining circuit for receiving the start pulses, address signals and control signals transmitted from said central unit through the bus lines,
(b') an address register for storing the address signals,
(c') a control register for storing the control signals,
(d') a discriminating circuit for comparing the contents of the address signals stored in said address register with a preliminarily set address in this discriminating circuit to detect any coincidence between them,
(e') an address coincidence memory for storing any coincidence detected by the discriminating circuit,
(f') a driving circuit connected to said control register and address coincidence memory to be actuated responsive to an output signal of the address coincidence memory and in accordance with the control signals stored in the control register,
(g') an operating circuit operated by said driving circuit, and
(h') a detecting circuit for detecting operating states of said operating circuit and transmitting a response signal depending on a detecting state of the operating circuit to the bus lines through the combining circuit in the terminal unit.

* * * * *